United States Patent
Sheu et al.

(10) Patent No.: US 7,662,428 B2
(45) Date of Patent: Feb. 16, 2010

(54) METHOD FOR CARBON NANOTUBE EMITTER SURFACE TREATMENT

(75) Inventors: Jyh-Rong Sheu, Hsinchu (TW); Chun-Tao Lee, Hsinchu (TW); Cheng-Chung Lee, Hsinchu (TW); Jia-Chong Ho, Hsinchu (TW); Yu-Yang Chang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1129 days.

(21) Appl. No.: 10/653,990

(22) Filed: Sep. 4, 2003

(65) Prior Publication Data

US 2004/0224081 A1 Nov. 11, 2004

(30) Foreign Application Priority Data

May 8, 2003 (TW) .............................. 92112541 A

(51) Int. Cl.
*B05D 5/12* (2006.01)

(52) U.S. Cl. ..................... 427/77; 427/372.2; 427/375

(58) Field of Classification Search .................. 427/77, 427/372.2, 375
See application file for complete search history.

(56) References Cited

U.S. PATENT DOCUMENTS

| 7,161,285 | B2 * | 1/2007 | Okamoto et al. ............ 313/311 |
| 7,276,844 | B2 * | 10/2007 | Bouchard et al. ........... 313/310 |
| 2002/0006558 | A1 * | 1/2002 | Kobayashi et al. ............ 430/7 |
| 2002/0074932 | A1 * | 6/2002 | Bouchard et al. ........... 313/495 |
| 2002/0112961 | A1 * | 8/2002 | O'Connor et al. ........... 204/601 |
| 2002/0124967 | A1 * | 9/2002 | Sharp ........................ 156/378 |
| 2002/0140348 | A1 * | 10/2002 | Takeuchi et al. ............ 313/581 |

OTHER PUBLICATIONS

English abstract of WO 02/41348; May 23, 2002.*

* cited by examiner

*Primary Examiner*—Timothy H Meeks
*Assistant Examiner*—Jimmy Lin

(57) ABSTRACT

A method for increasing the number of carbon nanotubes exposed on the triode structure device of a field emission display uses the technology of casting surface treatment. For advancing the current density and magnitude of CNT emitters, the method of casting surface treatment on the CNT emitters includes the steps of coating an adhesive material on the surface of the device; heating the adhesive material for adhibitting the surface; and lifting the adhesive material off the surface.

4 Claims, 5 Drawing Sheets

METHOD FOR CARBON NANOTUBE EMITTER SURFACE TREATMENT

BACKGROUND OF THE INVENTION

1. Field of the Invention

The invention relates to a method for carbon nanotube emitter surface treatment, which is used to increase the number of CNTs (carbon nanotubes) exposed on a field emission display (FED) device for advancing the current density and magnitude of CNT emitters.

2. Description of the Prior Art

To implement a flat panel display, the CNT-FED (carbon nanotube field emission display) adopts the technology of screen-printing process and FED display in the prior art. It not only keeps the image quality of a CRT display, but also the advantage of power-saving and slim-volume, and with the characters of CNTs including low-conducting electronic field required, high density of emission current, and high stability. As a result, it may offer a flat panel display with good luminous efficiency, and large-size screen as well as power-saving and low-cost.

FIG. 1 shows the luminous theory of the triode structure of a carbon nanotube field emitter display (CNT-FED) in the prior art. The display includes an array structure, which is used to raise the electronic energy up, advance the luminous efficiency, and diminish the control voltage. The manufacturing of the display structure based on the CNT-FED luminous theory includes the processing steps of fabricating a cathode plate 102 above a substrate 101, and further depositing the nano-scale carbon nanotube on the cathode plate 102 to serve as an electronic source 103. The cathode plate 102 connects with a gate 105 by a dielectric 104, and a voltage generated from the gate 105 is used to pull the electronics out of the cathode plate 102. The current direction of the electronics from cathode plate 102 is in the directions of arrows shown on FIG. 1. Because of an anode plate 107 set on the triode structure, the electronics emit from cathode plate 102 and impact on fluorescent screen 106. Finally, the display generates the red, green and blue light through a glass plate 108.

In the prior art, when manufacturing the CNT emitters, the CNTs (Carbon Nano Tubes) and the organic matters are mixed to produce the CNT paste to be coated on the substrate and processed with masking by using the screen printing technology so as to form a field emission electronic source. Therefore, the number of the CNTs exposed on the surface of the CNT layer is closely related to the density of the field emission current. It is the key factor that affects the current density of the field emission display. However, the drawback of the prior art is in the problem associated with the uniformity of the field emission electronic source.

In order to resolve the problem of the uniformity of the surface of the CNT layer of the CNT emitters in the prior art, Samsung Electronic Inc. provides a technology where the laser scanning method is used for evening the surface. In U.S. Pat. No. 6,436,221, titled with "Method of Improving Field Emission Efficiency for Fabricating Carbon Nanotube Field Emitters", a manufacturing process for improving the field emission efficiency of the CNT electronic source is provided.

SUMMARY OF THE INVENTION

It is a primary object of the present invention to provide a method for carbon nanotube emitter surface treatment, which is used to increase the number of carbon nanotubes exposed on the triode structure device. For advancing the current density and intensity of CNT emitters, the invention uses a method of casting surface treatment on the CNT emitters including the steps of coating an adhesive material on the surface of device; heating the adhesive material for adhibiting the surface; and lifting the adhesive material off.

The casting surface treatment of the present invention can process the CNT electronic source in the triode or any structure to improve the uniformity of the surface of the CNTs on the carbon nanotube field emitter display in any kind of structure, and then increase the number of the CNTs exposed on the device.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

In the triode structure of carbon nanotube field emission display (CNT-FED), the invention adopts a method for casting surface treatment to increase the number of carbon nanotubes exposed on the surface of the device. And the invention also can advance the current density and intensity of the CNT emitters in the gate hole formed around the CNT electronic source in the triode or any structure of CNT-FED so that the CNT emitters can emit the electronics in high-density and great-intensity uniformly.

Figure 1:
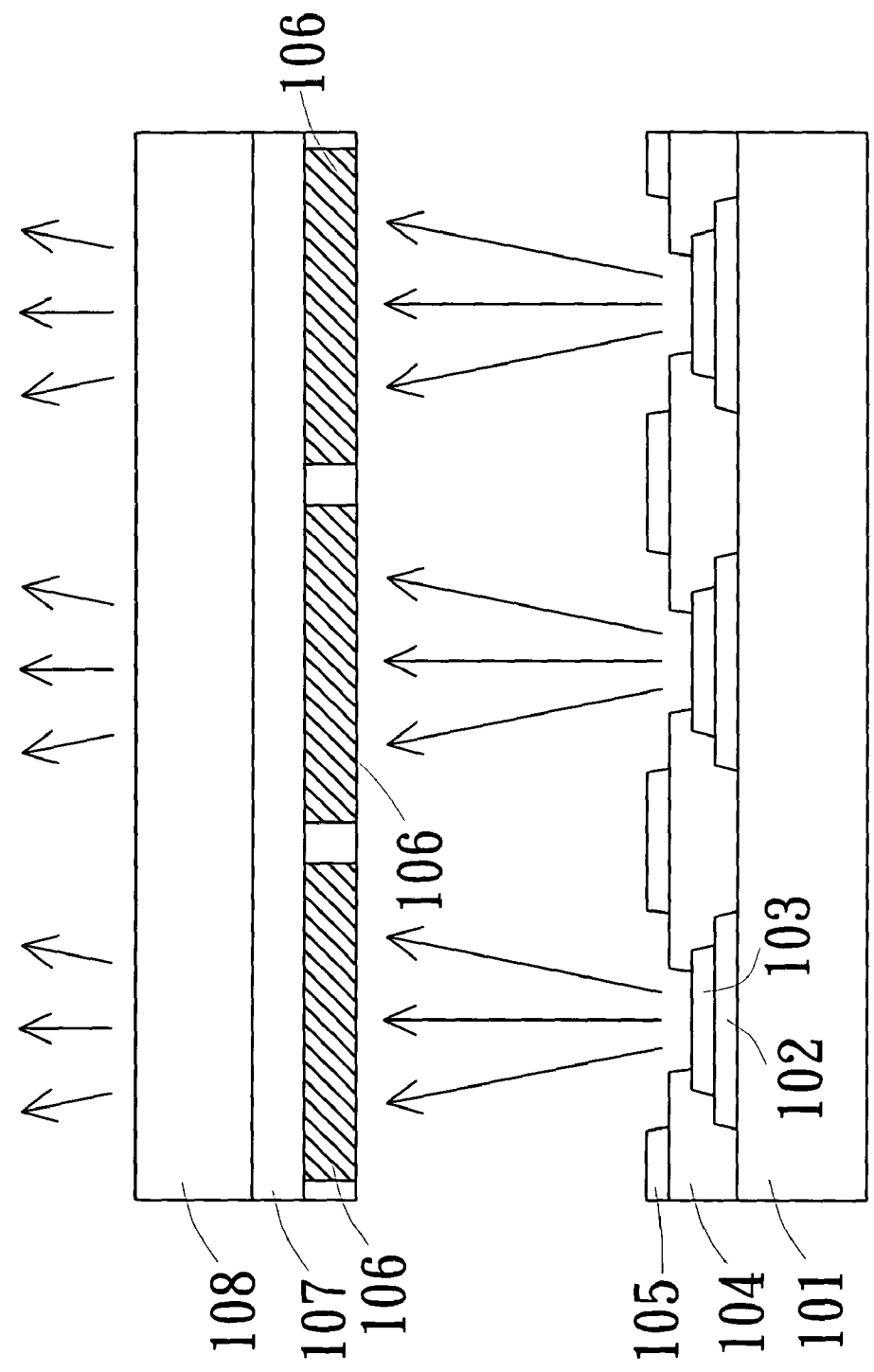
FIG. 1 is a schematic diagram showing the luminous theory of the triode structure of carbon nanotube field emitter display.
Figure 2A:
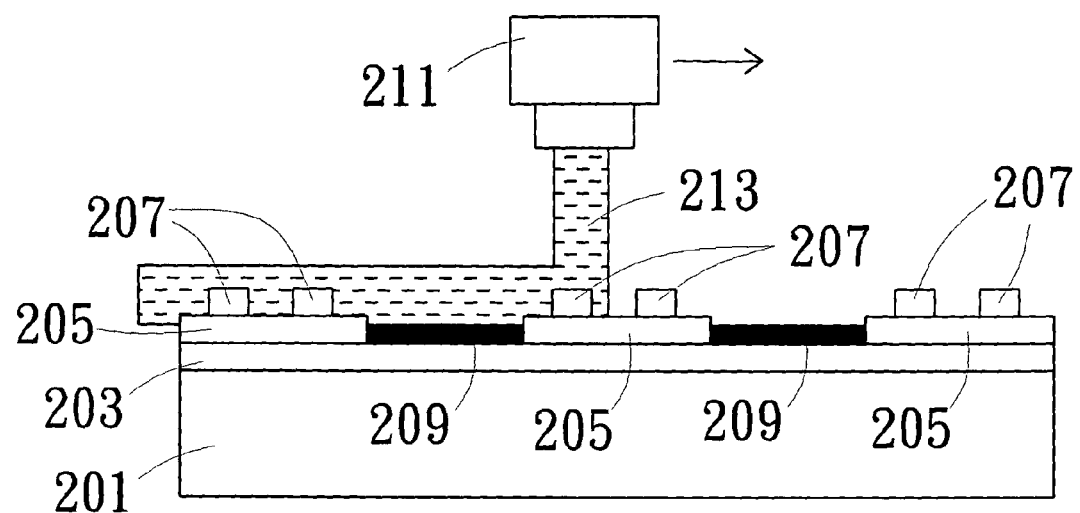
FIG. 2A is the 1st schematic diagram showing the method for carbon nanotube emitter surface treatment in accordance with the first preferred embodiment of the present invention.
Figure 2B:
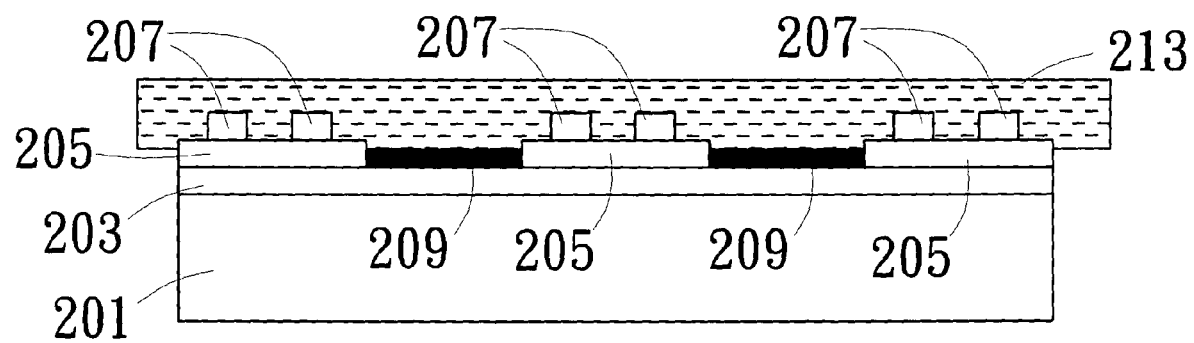
FIG. 2B is the 2nd schematic diagram showing the method for carbon nanotube emitter surface treatment in accordance with the first preferred embodiment of the present invention.
Figure 2C:
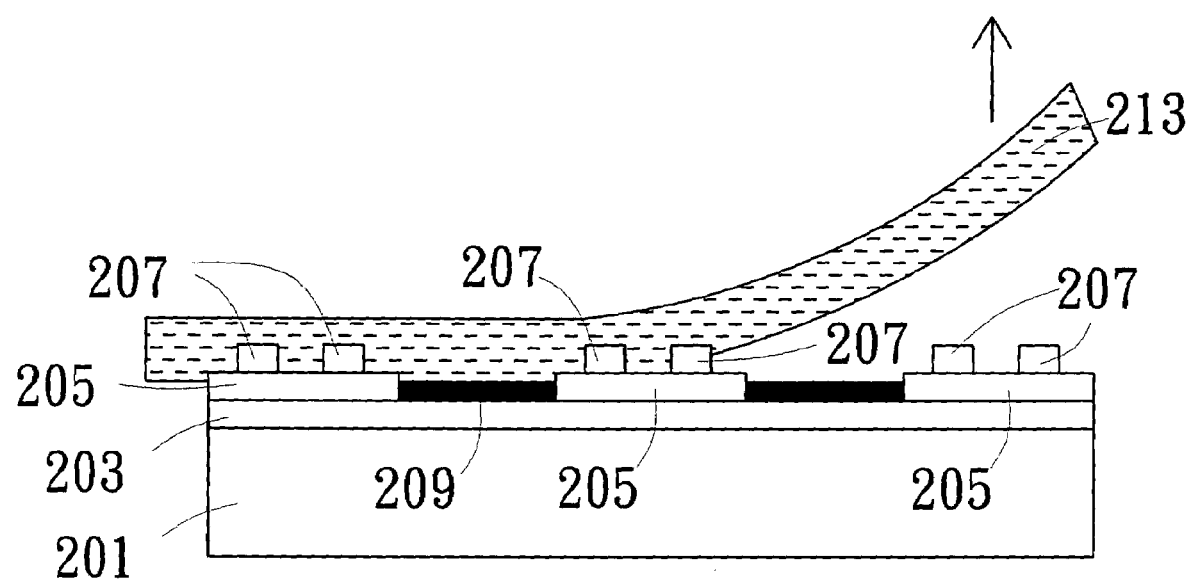
FIG. 2C is the 3rd schematic diagram showing the method for carbon nanotube emitter surface treatment in accordance with the first preferred embodiment of the present invention.

The method of surface treatment comprises the steps below:

Please refer to FIG. 2A to FIG. 2C, which are schematic diagrams showing the method for carbon nanotube emitter surface treatment in accordance with the first preferred embodiment of the present invention. The figures show a triode structure of CNT-FED using the manufacturing process of semi-conductor thin film. First, with reference to the FIG. 2A, there is a two-dimension distribution cathode plate 203 fabricated on a glass substrate 201, and there is a dielectric 205 between the glass substrate 201 and a gate 207 of the triode CNT-FED. When there exists electric charges on the gate 207, some free electronics will be pulled out from the cathode plate 203. Then these free electronics will move on the way to gate 207, and become an electronic channel. Furthermore, there are carbon nanotubes deposited above the cathode plate 203 to generate a greater current density, more powerful intensity CNT electronic source 209.

In FIG. 2A, there is a dispenser 211 for coating an adhesive material 213 on the surface of the CNT-FED structure. The method of the invention is not limited by the area size to be coated, and the adhesive material 213 is not only sticky but also impervious to the device. The adhesive material 213 may be a thermal adhesive such as a hot melt glue or a soluble material, an organic material, an inorganic material or a strippable material. FIG. 2B shows a step of melting the adhesive material 213. As the adhesive material 213 is heated, it will be soften and attached on the triode structure surface of the CNT-FED closely and uniformly. After the process of coating, melting and attaching the adhesive material 213 to the surface of device, the adhesive material 213 is lifted off from the surface of the CNT-FED, especially from the surface of the CNT electronic source 209 above the device as showed in FIG. 2C. For improving the luminosity and uniformity of the display panel as the electronics impact the fluorescent screen on the anode plate, the step of lifting the adhesive material off can remove the impurity, which affects the electronics emission, from the surface of the CNTs, and increase the number of carbon nanotubes exposed on the triode structure device.

FIG. 3A to FIG. 3D are the schematic diagrams showing the method for carbon nanotube emitter surface treatment in accordance with the second preferred embodiment of the present invention. In these diagrams, there is a cathode plate 303 fabricated on a substrate 301, and there is a dielectric layer 305 deposited between the cathode plate 303 and the gate 307 of the triode CNT-FED. Furthermore, there is a CNT layer 309 deposited as a carbon nanotube electronic source which is set between the cathode plate and the gates in the triode structure, wherein the CNT layer 309 mentioned above is the CNT electronic source.

Figure 3A:
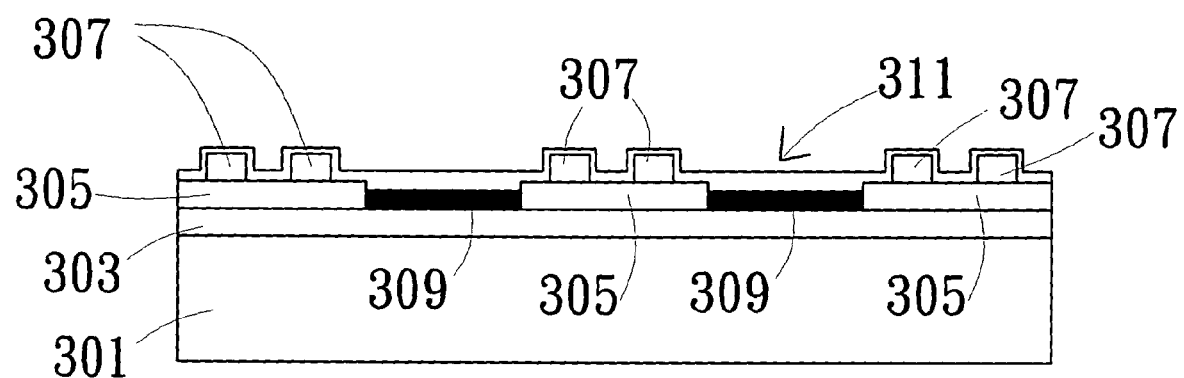
FIG. 3A is the 1st schematic diagram showing the method for carbon nanotube emitter surface treatment in accordance with the second preferred embodiment of the present invention.
Figure 3B:
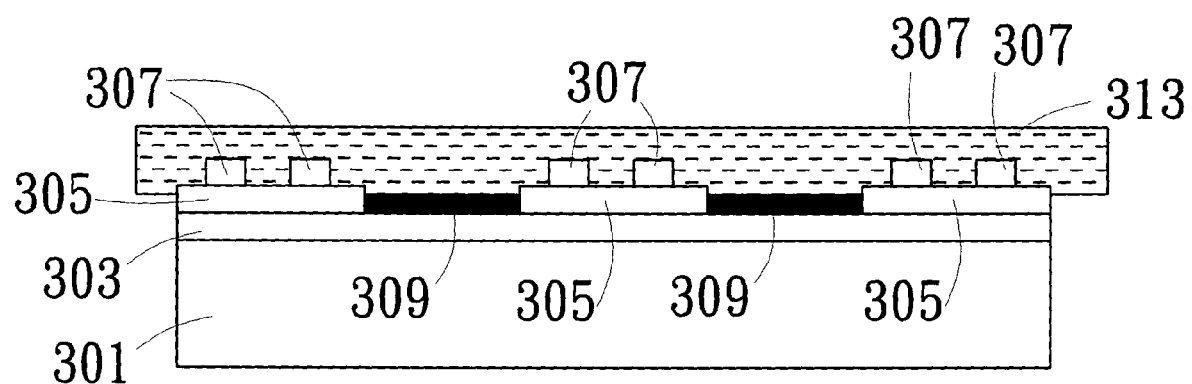
FIG. 3B is the 2nd schematic diagram showing the method for carbon nanotube emitter surface treatment in accordance with the second preferred embodiment of the present invention.
Figure 3C:
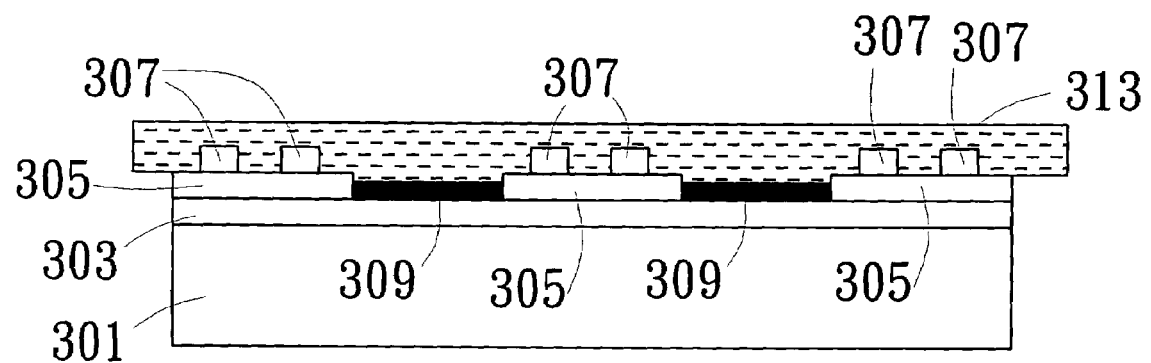
FIG. 3C is the 3rd schematic diagram showing the method for carbon nanotube emitter surface treatment in accordance with the second preferred embodiment of the present invention.
Figure 3D:
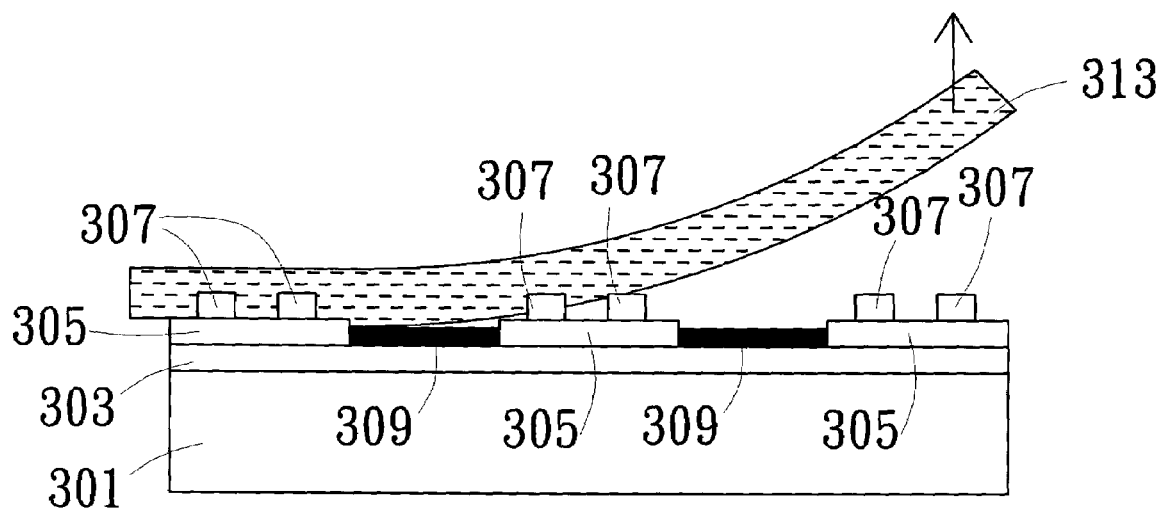
FIG. 3D is the 4th schematic diagram showing the method for carbon nanotube emitter surface treatment in accordance with the second preferred embodiment of the present invention.

In FIG. 3A, which shows the step of coating an activator 311 on the surface of the CNT-FED triode structure, the activator 311 may be an interface activator, a surfactant or any release agent, and the activator 311 is used to prevent too closely sticky between the adhesive material 313 and dielectric layer 305 in the gate hole. FIG. 3B shows the step of coating an adhesive material 313 on the activator above the CNT-FED triode structure. The process showed on FIG. 3C is a step of pressing the adhesive material 313 for adhibitting the device surface closely by a laminator. The adhesive material 313 may be thermal adhesives or a soluble material, an organic material, an inorganic material or a strippable material. FIG. 3D shows the step of lifting the adhesive material 313 off from the triode surface of CNT-FED, i.e. lifting the impurity or any other adhesion, which may affect the electronic emission density and intensity of the CNT electronic source 309, off from the device surface.

According to the above discussion, the present invention discloses a method for carbon nanotube emitter surface treatment, which adopts a method of casting surface treatment on the CNT emitters for increasing the number of carbon nanotubes exposed on the triode structure device, and then advancing the current density and intensity of the CNT emitters.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for carbon nanotube emitter surface treatment, which is used on a carbon nanotube electronic source for increasing the number of carbon nanotubes exposed on a triode structure or other surface structure of a carbon nanotube field emission display (CNT-FED), the method for carbon nanotube emitter surface treatment comprising the steps of:

coating an adhesive material on the surface of said CNT-FED;

heating and melting the coated adhesive material for attaching said adhesive material on a triode structure surface of said CNT-FED; and removing impurities on the surface of said CNT-FED by lifting said adhesive material off.

2. The method for carbon nanotube emitter surface treatment as claimed in claim 1, wherein said adhesive material is selected from the group consisting of a hot melt glue, a soluble material, an organic material, an inorganic material and a strippable material.

3. The method for carbon nanotube emitter surface treatment as claimed in claim 1, wherein said adhesive material sticks on said carbon nanotube electronic source.

4. The method for carbon nanotube emitter surface treatment as claimed in claim 3, wherein said carbon nanotube electronic source is set between a cathode plate and a gate in said triode structure.

* * * * *